(12) United States Patent
Wu (10) Patent No.: US 11,253,778 B2
(45) Date of Patent: Feb. 22, 2022

(54) PROVIDING CONTENT

(71) Applicant: Microsoft Technology Licensing, LLC, Redmond, WA (US)

(72) Inventor: Xianchao Wu, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 266 days.

(21) Appl. No.: 16/484,725

(22) PCT Filed: Mar. 1, 2017

(86) PCT No.: PCT/CN2017/075317
§ 371 (c)(1),
(2) Date: Aug. 8, 2019

(87) PCT Pub. No.: WO2018/157329
PCT Pub. Date: Sep. 7, 2018

(65) Prior Publication Data
US 2020/0038748 A1     Feb. 6, 2020

(51) Int. Cl.
| | |
|---|---|
| A63F 13/87 | (2014.01) |
| A63F 13/30 | (2014.01) |
| A63F 13/23 | (2014.01) |
| A63F 13/67 | (2014.01) |
| A63F 13/95 | (2014.01) |

(52) U.S. Cl.
CPC ............. *A63F 13/30* (2014.09); *A63F 13/23* (2014.09); *A63F 13/67* (2014.09); *A63F 13/87* (2014.09); *A63F 13/95* (2014.09); *A63F 2300/308* (2013.01)

(58) Field of Classification Search
CPC .......... A63F 13/23; A63F 13/30; A63F 13/67; A63F 13/87; A63F 13/95; A63F 2300/308
See application file for complete search history.

(56) References Cited

U.S. PATENT DOCUMENTS

| | | | |
|---|---|---|---|
| 5,679,075 A | * 10/1997 | Forrest | ............... A63F 13/847 463/9 |
| 8,082,499 B2 | 12/2011 | Hudson et al. | |
| 8,734,226 B2 | 5/2014 | Heaton et al. | |
| 8,814,663 B2 | * 8/2014 | Vogel | ............... G07F 17/3272 463/25 |
| 8,814,701 B2 | 8/2014 | Vogel et al. | |

(Continued)

FOREIGN PATENT DOCUMENTS

| | | |
|---|---|---|
| CN | 101068177 A | 11/2007 |
| CN | 101076184 A | 11/2007 |

(Continued)

OTHER PUBLICATIONS

"Extended European Search Report Issued in European Patent Application No. 17899009.9", dated Jul. 31, 2020, 10 Pages.

(Continued)

*Primary Examiner* — Steven J Hylinski
(74) *Attorney, Agent, or Firm* — Schwegman Lundberg & Woessner, P.A.

(57) ABSTRACT

The present disclosure provides method and apparatus for providing content in an electrical game. Current interface information of the electrical game may be obtained. Content associated with the electrical game may be provided in a chat flow based on at least the current interface information.

16 Claims, 7 Drawing Sheets

(56) References Cited

U.S. PATENT DOCUMENTS

| | | | |
|---|---|---|---|
| 8,911,296 | B2 | 12/2014 | Chudley et al. |
| 9,108,108 | B2* | 8/2015 | Zalewski ............... A63F 13/63 |
| 9,202,171 | B2 | 12/2015 | Kuhn |
| 9,338,493 | B2 | 5/2016 | Van Os et al. |
| 10,279,264 | B1* | 5/2019 | Aghdaie ............ A63F 13/5375 |
| 10,357,713 | B1* | 7/2019 | Landers ............... G06Q 40/025 |
| 2003/0109305 | A1* | 6/2003 | Gavin ..................... A63F 13/54 |
| | | | 463/31 |
| 2010/0063799 | A1 | 3/2010 | Jamieson |
| 2010/0324908 | A1 | 12/2010 | Rosser et al. |
| 2012/0078636 | A1 | 3/2012 | Ferrucci et al. |
| 2013/0150139 | A1* | 6/2013 | Oakes ................. G07F 17/3258 |
| | | | 463/16 |
| 2013/0204813 | A1 | 8/2013 | Master et al. |
| 2013/0212501 | A1 | 8/2013 | Anderson et al. |
| 2013/0316779 | A1 | 11/2013 | Vogel |
| 2014/0136187 | A1 | 5/2014 | Wolverton et al. |
| 2015/0100530 | A1 | 4/2015 | Mnih et al. |
| 2016/0055236 | A1 | 2/2016 | Frank et al. |
| 2016/0098379 | A1 | 4/2016 | Bufe et al. |
| 2017/0340256 | A1* | 11/2017 | Suskind ............... A61B 5/4803 |
| 2019/0143218 | A1* | 5/2019 | Sulakhe ................. A63F 13/55 |
| | | | 463/40 |

FOREIGN PATENT DOCUMENTS

| | | |
|---|---|---|
| CN | 105653274 A | 6/2016 |
| CN | 105975530 A | 9/2016 |
| CN | 106249901 A | 12/2016 |
| WO | 03073417 A2 | 9/2003 |
| WO | 2015187048 A1 | 12/2015 |

OTHER PUBLICATIONS

Cho, et al., "Learning Phrase Representations using RNN Encoder-Decoder for Statistical Machine Translation", In Proceedings of Conference on Empirical Methods in Natural Language Processing, Oct. 25, 2014, 15 Pages.

Krizhevsky, et al., "ImageNet Classification with Deep Convolutional Neural Networks", In Proceedings of the 25th International Conference on Neural Information Processing Systems, Dec. 3, 2012, pp. 1-9.

Mikolov, et al., "Distributed Representations of Words and Phrases and their Compositionality", In Proceedings of 27th Annual Conference on Neural Information Processing Systems, Dec. 5, 2013, pp. 1-9.

Mnih, et al., "Playing Atari with Deep Reinforcement Learning", In Journal of the Computing Research Repository, Dec. 19, 2013, pp. 1-9.

Silva-Coira, et al., "Intelligent Virtual Assistant For Gamified Environments", In Proceedings of Pacific Asia Conference on Information System, Jun. 27, 2016, 08 Pages.

"International Search Report and Written Opinion Issued in PCT Application No. PCT/CN2017/075317", dated Sep. 27, 2017, 11 Pages.

* cited by examiner

PROVIDING CONTENT

CROSS-REFERENCE TO RELATED APPLICATIONS

This application is a U.S. National Stage Filing under 35 U.S.C. 371 of International Patent Application Serial No. PCT/CN2017/075317, filed Mar. 1, 2017, and published as WO 2018/157329 A1 on Sep. 7, 2018, which application and publication are incorporated herein by reference in their entirety.

BACKGROUND

Artificial Intelligence (AI) chatbot is designed to simulate people's conversation, and may chat with people by text, speech, image, etc. The chatbot is becoming more and more popular, and is being applied in an increasing number of scenarios. In some image-based electrical games, a chatbot may be incorporated for answering players' questions or chatting with the players. For example, Augmented Reality (AR) games may use a chatbot to assist players to play the games.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure may apply an AI chatbot in an image-based electrical game. The chatbot may provide content associated with the electrical game to a player in a chat flow. The content associated with the electrical game may include various types of information, such as, a response to a message inputted by the player, information of a current game image, a recommended game strategy, etc.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Existing chatbots in electrical games can perform simple interactions with players, such as, answering players' questions by text. Different from the existing chatbots in electrical games, an AI chatbot according to embodiments of the present disclosure may provide more effective assistances to players, and may improve players' experience. The embodiments of the present disclosure may apply the chatbot in an image-based electrical game. The chatbot may provide content associated with the electrical game to a player in a chat flow. The content associated with the electrical game may include various types of information associated with the electrical game, such as, a multimedia response to a message inputted by the player, information of a current game image, a recommended game strategy, etc. Herein, the chat flow may refer to a chatting procedure including messages from players and responses from the chatbot. The electrical game may have a game interface, which includes a game screen and a chat window. The game screen may be used for displaying game images. The chat window may be used by the chatbot to interact with the player, such as, the chat flow may be displayed in the chat window.

Figure 1:
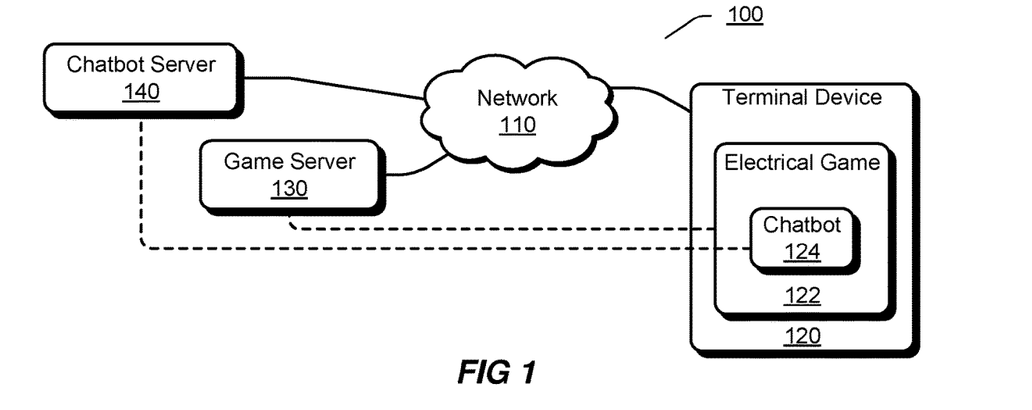
FIG. 1 illustrates an exemplary application scenario of a chatbot according to an embodiment.

FIG. 1 illustrates an exemplary application scenario 100 of a chatbot according to an embodiment.

In FIG. 1, a network 110 is applied for interconnecting among a terminal device 120, a game server 130 and a chatbot server 140.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, assessing servers or websites on the network 110, processing data or signals, etc. For example, the terminal device 120 may be desktop computers, laptops, tablets, smart phones, etc. Although only one terminal device 120 is shown in FIG. 1, it should be appreciated that a different number of terminal devices may connect to the network 110.

The terminal device 120 may run an electrical game 122. The electrical game 122 may be a game client installed on the terminal device 120, which can interact with the game server 130 through the network 110. The game server 130 may provide game parameters or data required by the running of the electrical game 122, and may also provide game processing capabilities for the electrical game 122 to some extent.

The terminal device 120 may include a chatbot 124 which may provide content associated with the electrical game 122 to a player in the electrical game 122. In some implementations, the chatbot 124 may be incorporated into the electrical game 122, and thus may be a part of the electrical game 122. In other implementations, the chatbot 124 may be an independent application on the terminal device 120, and may be configured for cooperating and interacting with the electrical game 124. The chatbot 124 may interact with the chatbot server 140. For example, the chatbot 124 may transmit messages inputted by the player to the chatbot server 140, and receive responses associated with the messages from the chatbot server 140. However, it should be appreciated that, in some implementations, instead of interacting with the chatbot server 140, the chatbot 124 may also locally generate responses to messages inputted by the player.

It should be appreciated that all the network entities shown in FIG. 1 are exemplary, and depending on specific application requirements, any other network entities may be involved in the application scenario 100.

Figure 2:
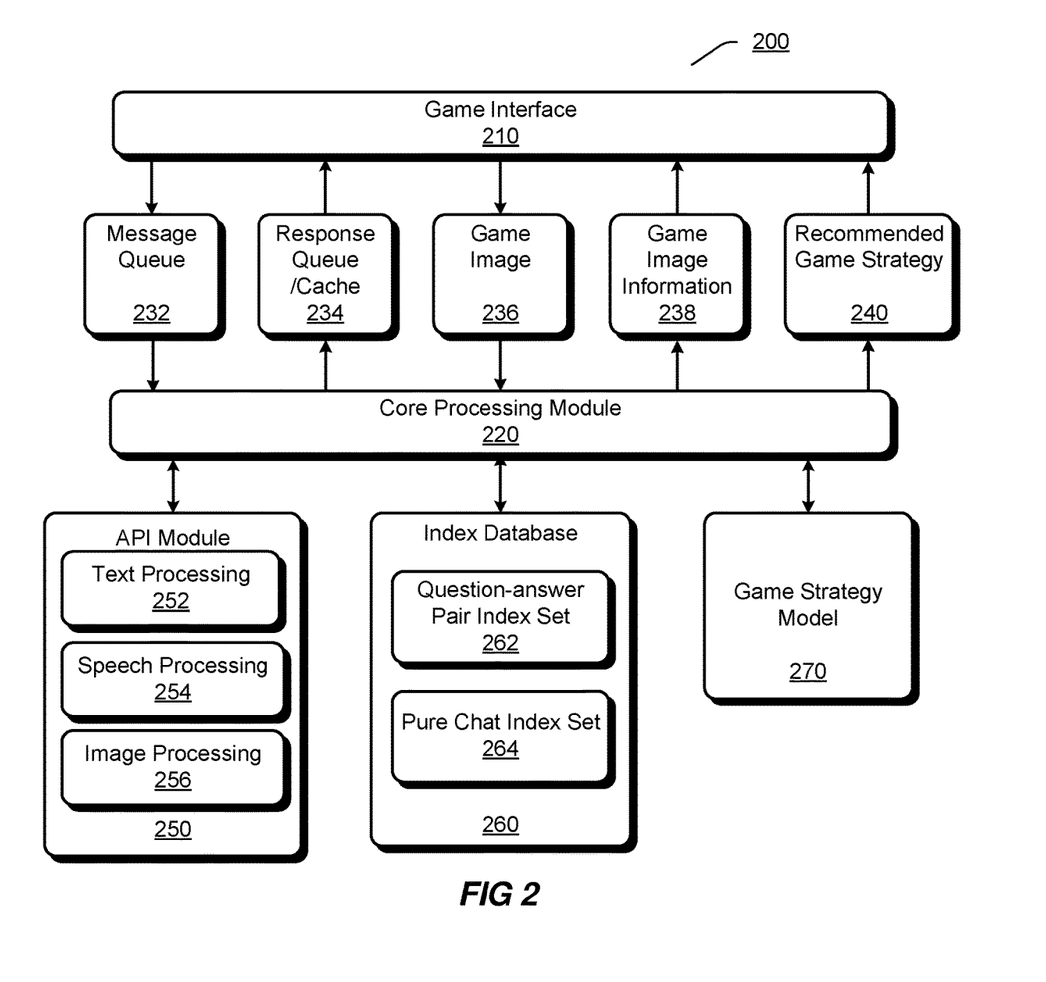
FIG. 2 illustrates an exemplary system applying a chatbot according to an embodiment.

FIG. 2 illustrates an exemplary system 200 applying a chatbot according to an embodiment.

The system 200 may comprise a game interface 210 of an electrical game. The game interface 210 is a type of user interface (UI) for information presenting. The game interface 210 may include a game screen for displaying game images, and a chat window for interacting with a player by the chatbot. It should be appreciated that the chat window may be provided by the game or by the chatbot.

The system 200 may comprise a core processing module 220 of the chatbot. The core processing module 220 is configured for providing processing capabilities, during operation of the chatbot, through cooperation with other modules of the chatbot.

The core processing module 220 may obtain messages inputted by the player in the chat window of the game interface 100, and store the messages in the message queue 232. The messages may be in various multimedia forms, such as, text, speech, image, video, etc.

The core processing module 220 may process the messages in the message queue 232 in a first-in-first-out manner. The core processing module 220 may invoke processing units in an application program interface (API) module 250 for processing various forms of messages. The API module 250 may comprise a text processing unit 252, a speech processing unit 254, an image processing unit 256, etc.

For a text message, the text processing unit 252 may perform text understanding on the text message, and the core processing module 220 may further determine a text response.

For a speech message, the speech processing unit 254 may perform a speech-to-text conversion on the speech message to obtain text sentences, the text processing unit 252 may perform text understanding on the obtained text sentences, and the core processing module 220 may further determine a text response. If it is determined to provide a response in speech, the speech processing unit 254 may perform a text-to-speech conversion on the text response to generate a corresponding speech response.

For an image message, the image processing unit 256 may perform image recognition on the image message to generate corresponding texts, and the core processing module 220 may further determine a text response. In some cases, the image processing unit 256 may also be used for obtaining an image response based on the text response.

Moreover, although not shown in FIG. 2, the API module 250 may also comprise any other processing units. For example, the API module 250 may comprise a video processing unit for cooperating with the core processing module 220 to process a video message and determine a response.

The core processing module 220 may determine responses through an index database 260. The index database 260 may comprise a plurality of index items that can be retrieved by the core processing module 220 as responses. The index items in the index database 260 may be classified into a question-answer pair index set 262 and a pure chat index set 264. Index items in the question-answer pair index set 262 are in a form of question-answer pair, and the question-answer pair index set 262 may comprise question-answer pairs associated with the game. Index items in the pure chat index set 264 are prepared for free chatting between the player and the chatbot, and may not be in a form of question-answer pair.

The responses determined by the core processing module 220 may be provided to a response queue or response cache 234. For example, the response cache 234 may ensure that a sequence of responses can be displayed in a pre-defined time stream. Assuming that, for a message, there are no less than two responses determined by the core processing module 220, then a time-delay setting for the responses may be necessary. For example, if a message inputted by the player is "Did you eat your breakfast?", two responses may be determined, such as, a first response "Yes, I ate bread" and a second response "How about you? Still feeling hungry?". In this case, through the response cache 234, the chatbot may ensure that the first response is provided to the player immediately. Further, the chatbot may ensure that the second response is provided in a time delay, such as 1 or 2 seconds, so that the second response will be provided to the player 1 or 2 seconds after the first response. As such, the response cache 234 may manage the to-be-sent responses and appropriate timing for each response.

The responses in the response queue or response cache 234 may be further transferred to the game interface 210 such that the responses can be displayed to the player.

The core processing module 220 may obtain a current game image 236 from the game screen of the game interface 210. The core processing module 220 may further retrieve a question-answer pair, which is associated with the current game image, from the question-answer pair index set 262 in the index database 260. The retrieved question-answer pair contains information describing the current game image or entities in the current game image, denoted as game image information 238. The retrieved question-answer pair may be transferred to the game interface 210 such that the game image information 238 can be displayed to the player. In this way, the chatbot may provide game information timely to the player as the game proceeds.

In some implementations, the current game image 236 may also be combined with a corresponding message in the message queue 232 by the core processing module 220, and the combination can be used for determining a response to the message.

In some implementations, the current game image 236 may be used by the chatbot to provide a recommended game strategy 240. Herein, the recommended game strategy may refer to a suggestion or enlightenment for guiding the player to proceed with the game in an effective and productive way. The recommended game strategy may be explicit or implicit. An explicit recommended game strategy may explicitly indicate what next action can be taken and what awards may be obtained. The core processing module 220 may use a game strategy model 270, which is pre-established through machine learning, to determine the explicit recommended game strategy corresponding to the current game image 236. An implicit recommended game strategy may include real time game information of other players having a matched game image with the player, e.g. being in the same or similar game image with the player. The core processing module 220 may find said other players through a matching of game image and further obtain game information of these players. The recommended game strategy 240 may be transferred to the game interface 210 such that the recommended game strategy 240 can be displayed to the player.

It should be appreciated that all the elements shown in the system 200 in FIG. 2 are exemplary, and depending on specific application requirements, any shown elements may be omitted and any other elements may be involved in the system 200.

Figure 3A:
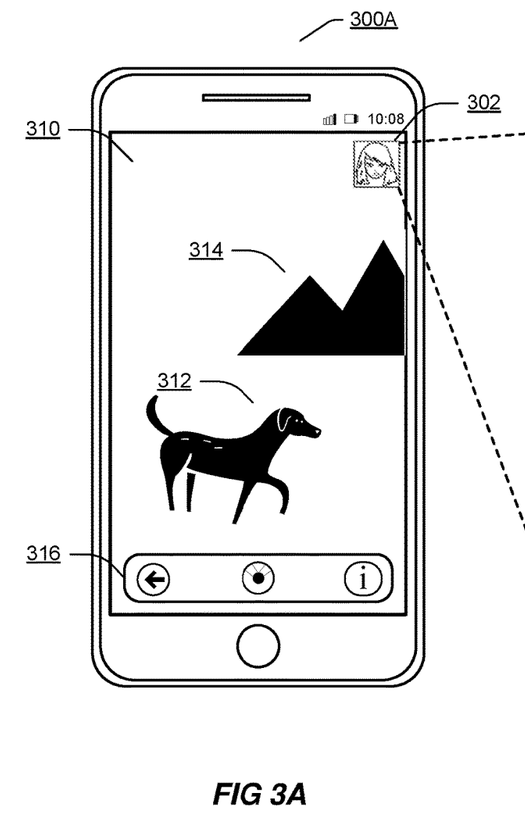
FIG. 3A and FIG. 3B illustrates exemplary displaying in a game interface according to an embodiment.
Figure 3B:
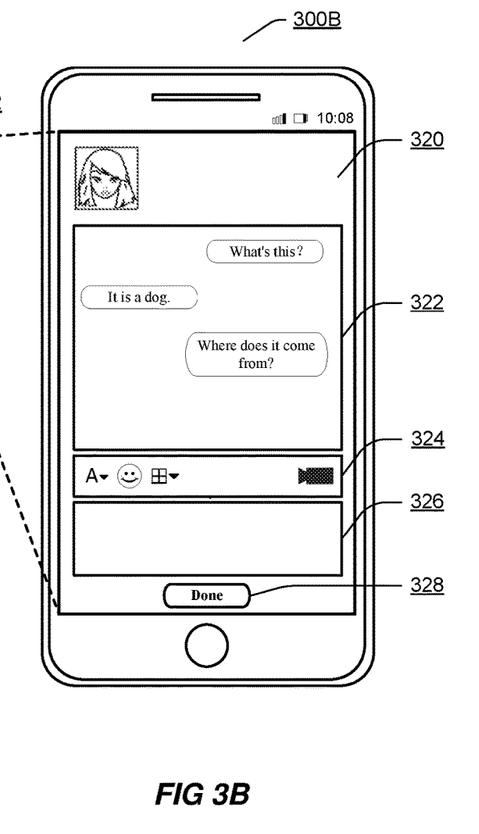

FIG. 3A and FIG. 3B illustrates exemplary displaying in a game interface according to an embodiment. In some implementations, the game interface may include a game screen and a chat window. The game screen and the chat window may be shown alternatively in the game interface. For example, the game screen and the chat window may be switched to each other in response to a player's operation. The game screen and the chat window may also be shown in an overlying manner. For example, the chat window may be shown over the game screen, and may cover the whole or a part of the game screen.

FIG. 3A illustrates exemplary displaying 300A in the game interface. A game screen 310 is shown in the game interface. The game screen 310 is displaying an entity 312 and an entity 314. A control panel 316 is also displayed in the game screen 310. The control panel 316 may include a plurality of virtual buttons for the player to perform actions or control in the game. An icon 302 is displayed at the top-right corner of the game screen 310. The icon 302 may be a logo of the chatbot. When the player touches the icon 302, the chat window may be displayed in the game interface.

FIG. 3B illustrates exemplary displaying 300B in the game interface. A chat window 320 is shown in the game interface. The chat window 320 may be displayed in response to a touching operation on the icon 302 in FIG. 3A by the player. The chat window 320 may comprise a presentation area 322, a control area 324 and an input area 326. The presentation area 322 displays messages and responses in a chat flow, the control area 324 includes a plurality of virtual buttons for the player to perform message input settings, and the input area 326 is used for the player to input messages. The chat window 320 may further comprise a virtual button 328. If the player touches the virtual button 328, the game interface may switch from the chat window 320 to the game screen 310.

It should be noted that all the elements and their layout shown in FIG. 3A and FIG. 3B are exemplary. Depending on specific application requirements, the game interface in FIG. 3A and FIG. 3B may omit or add any elements, and the layout of the elements in the game interface in FIG. 3A and FIG. 3B may also be changed in various manners.

Figure 4:
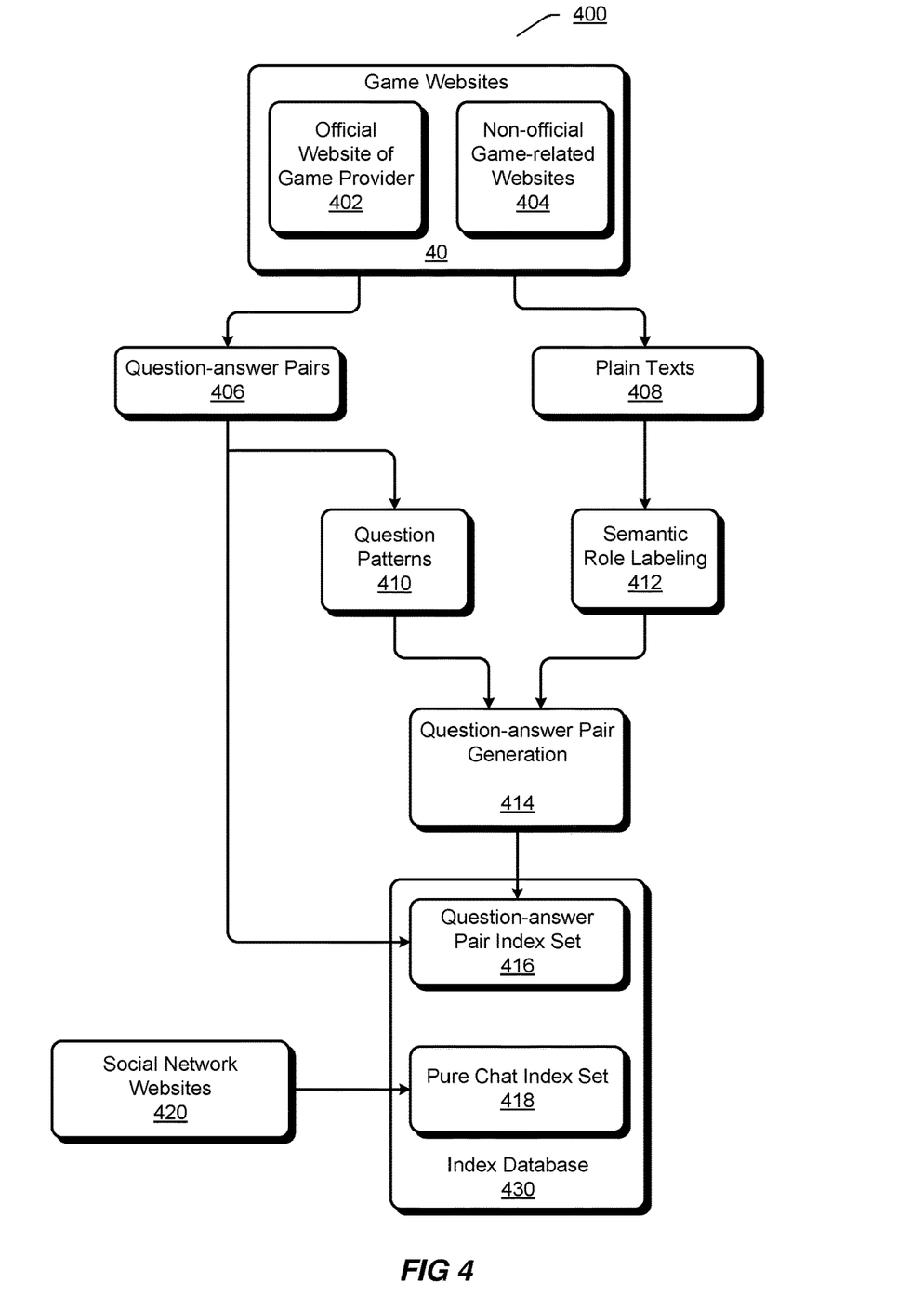
FIG. 4 illustrates an exemplary process for establishing an index database according to an embodiment.

FIG. 4 illustrates an exemplary process 400 for establishing an index database according to an embodiment. The index database may be used by a chatbot to provide content in an electrical game. The index database may comprise a question-answer pair index set and a pure chat index set.

Data resources for establishing the question-answer pair index set may be game websites 40. The game websites 40 may comprise at least two types of data resource. One type of data resource is an official website 402 of a provider of the game. The provider of the game may issue the game, revise the game, or appending new features to the game. The provider may publish various types of information related to the game on the official website 402, such as, brief game introduction, game interfaces, existing or new features of the game, revision of the game, profiles of characters in the game, frequently asked questions and corresponding official answers, etc. Another type of data source is non-official game related websites 404 that are operated by parties other than the provider of the game. The non-official game related websites 404 may provide various types of information related to various games and may provide a platform for users to post their game related experiences, stories, opinions, etc.

In some implementations, the chatbot may obtain website data related to the game from the official website 402 and the non-official game related websites 404 by any types of data crawling technique. In other implementations, the official website 402 or the non-official game related websites 404 may also initiatively provide the website data to the chatbot. The website data may be classified into question-answer pairs 406 and plain texts 408. The question-answer pairs 406 are in a question-answer pair style, which may include, for example, official question-answer pairs from the official website 402 and question-answer pairs created by users from the non-official game related websites 404. The plain texts 408 are in a knowledge data style, which may include, such as, various types of information related to the game, other than question-answer pairs, from the official website 402 and the non-official game related websites 404.

The question-answer pairs 406 may be directly indexed and added into the question-answer pair index set 416. The plain texts 408 may be used for generating question-answer pairs, and then the generated question-answer pairs may be indexed and added into the question-answer pair index set 416.

In the process for generating question-answer pairs from the plain texts 408, a semantic role labeling (SRL) technique 412 may be adopted. The SRL may be used for identifying various semantic roles in a sentence and thus obtaining a semantic structure of the sentence. The SRL may detect predicates in a sentence and find arguments to each of the predicates. For example, the SRL may identify subject arguments, object arguments, time arguments, location arguments, etc. in a sentence.

In the process for generating question-answer pairs from the plain texts 408, question patterns 410 may be generated or concluded from the question-answer pairs 406. Herein, the question patterns may refer to sentence structures and question words of questions, which may indicate what kind of question word can be used in a question, which argument can be questioned by the question, etc. For an exemplary question-answer pair including a question "Who broke the window?" and an answer "Peter broke the window", a question pattern "Who did . . . ?" may be concluded. In this question pattern, the question word is "Who", and the argument being questioned is a subject argument, e.g., "Peter". For another exemplary question-answer pair including a question "When did Peter break the window?" and an answer "Peter broke the window yesterday", a question pattern "When did . . . ?" may be concluded. In this question pattern, the question word is "When", and the argument being questioned is a time argument, e.g., "yesterday".

At 414, question-answer pairs may be generated based on the question patterns 410 and the plain texts being performed SRL 412. As mentioned above, the SRL 412 may identify various arguments in a plain text, and the question patterns may indicate what sentence structure and question word may be used for questioning an argument in the plain text. For example, assuming a plain text "Robert drives a red car", a question-answer pair of "Who drives a red car?" and "Robert" may be generated for questioning the subject argument "Robert", a question-answer pair of "What does Robert drive?" and "A red car" may be generated for questioning the object argument "red car", etc.

It should be appreciated that the existing SRL technique can only perform SRL analysis on one sentence, while the embodiments of the present disclosure may perform SRL analysis on a group of sentences and accordingly may generate question-answer pairs from a group of sentences in the plain texts. This is beneficial in the case that the group of sentences is under the same topic.

Figure 5:
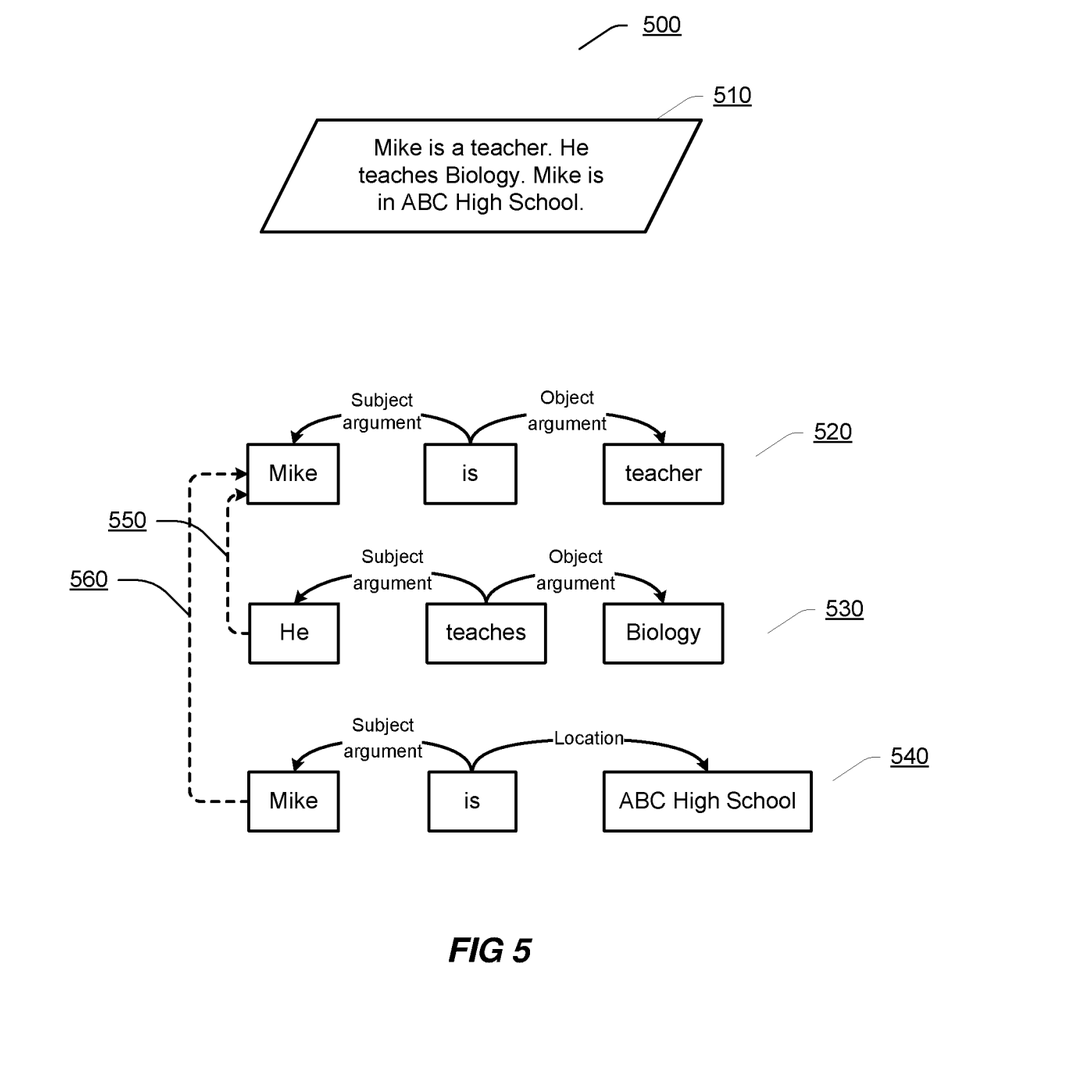
FIG. 5 illustrates an exemplary process for performing semantic role labeling according to an embodiment.

FIG. 5 illustrates an exemplary process 500 of performing SRL according to an embodiment. The process 500 may perform SRL analysis on a group of sentences in a paragraph.

A group of sentences is shown in block 510, which includes three sentences: a first sentence "Mike is a teacher", a second sentence "He teaches Biology", and a third sentence "Mike is in ABC High School".

At 520, 530 and 540, SRL analysis is performed on the three sentences respectively. The arguments in each sentence are determined through SRL, and accordingly semantic structures of the sentences are also determined.

In an implementation, similar or related arguments among sentences may be connected. For example, at 550, it may be determined that the pronoun "He" in the second sentence refers to "Mike" in the first sentence, and thus the second sentence may be construed as a further description to the first sentence. At 560, it may be determined that "Mike" in the third sentence refers to "Mike" in the first sentence, and thus the third sentence may also be construed as a further description to the first sentence.

Based on the SRL analysis at 520, 530 and 540, and the relationship among the three sentences determined at 550 and 560, a complete semantic structure of the paragraph may be obtained accordingly.

Return back to FIG. 4, the semantic structure of the paragraph determined through FIG. 5 may be used together with the question patterns 410 for generating question-answer pairs at 414. For example, if it is to question the location argument "ABC High School" in the third sentence, a question-answer pair of "Where does Mike teach Biology?" and "ABC High School" may be generated, if it is to question the object argument "Biology" in the second sentence, a question-answer pair of "What does Mike teach in ABC High School?" and "Biology" may be generated, etc.

Besides generating question-answer pairs from a group of sentences through SRL analysis as discussed above, some implementations of the present disclosure may also generate question-answer pairs from a group of sentences through discriminating a major sentence from the group of sentences. The major sentence may be a representative sentence in the group of sentences, which may contain most key information of the group of sentences. Various approaches may be adopted for determining the major sentence in the group of sentences. For example, through applying an existing Singular Value Decomposition (SVD) technique in connection with term frequency statistics, a sentence containing the most notional words or the most high-frequency words among a group of sentences may be determined as a major sentence. Questions in the question-answer pairs may be generated only based on the major sentence in the group of sentences, and answers in the question-answer pairs may be generated based on the major sentence, other sentences than the major sentence in the group of sentences, or both.

The question-answer pairs generated at 414 may be indexed and added into the question-answer pair index set 416.

Data resources for establishing the pure chat index set 418 may comprise, such as, social network websites 420. The embodiment of the present disclosure may crawl data from the social network websites through any existing crawling techniques, and then index the crawled data as index items into the pure chat index set 418 through any existing techniques for creating indices. According to an implementation, the index items in the pure chat index set 418 may be classified into a game related subset that is associated with the game and a non-game related subset that is not associated with the game. When the chatbot retrieves a response to a message inputted by a player, the game related subset may be given a higher priority or weight than the non-game related subset. Thus, the chatbot may provide a game related response in a higher priority, which may satisfy desires of the provider of the game, who may expect the chatbot to provide responses related to the game as many as possible.

The question-answer pair index set 416 and the pure chat index set 418 may be included together in the index database 430. It should be appreciated that the index database 430 may be updated dynamically. For example, the data on the official website 402 may be frequently updated, and accordingly, the process 400 may be performed dynamically once any updated data is obtained.

In some implementations, images associated with question-answer pairs in the question-answer pair index set may be further added into the index database. For this purpose, an image-text similarity model may be trained. The image-text similarity model may be, such as, a Convolutional Neural Network-Recurrent Neural Network (CNN-RNN) similarity model.

For the purpose of obtaining training data, firstly, various existing language processing techniques may be adopted for determining key words from question-answer pairs in the question-answer pair index set. Then, images associated with the key words may be obtained through image search engines, such as, Bing image search. A list of <question-answer pair, image> may be used as training data. The CNN-RNN similarity model may be trained based on the training data. According to the established CNN-RNN similarity model, the CNN part in the model may convert an image into a space vector, and the RNN part in the model may convert one or more sentences, such as a question-answer pair, into a space vector. Similarity between a question-answer pair and an image may be calculated based on the vector corresponding to the question-answer pair and the vector corresponding to the image.

During the training of the CNN-RNN similarity model, a plurality of images may be found having similarities, that are above a predetermined threshold, with corresponding question-answer pairs, and these images may be added into the index database in association with the corresponding question-answer pairs. Thus, when determining a response to a message, both or either of a question-answer pair and an image associated with the question-answer pair may be determined as the response.

Figure 6:
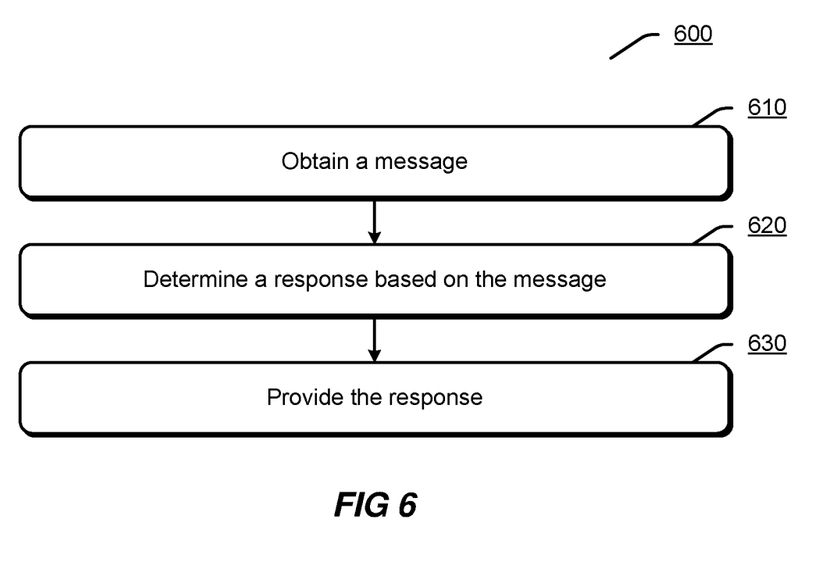
FIG. 6 illustrates a flowchart of an exemplary method for providing a response according to an embodiment.

FIG. 6 illustrates a flowchart of an exemplary method 600 for providing a response according to an embodiment. Through the method 600, a response may be determined and provided based on a message.

At 610, a message may be obtained from a chat window of a game interface. The message may be inputted by a player of a game in the chat window. The message may include, such as, greetings, query, comment, reply to the chatbot's question or response, etc.

At 620, a response may be determined from an index database based on the message. As discussed above, the index database may include index items. Similarities between the message and the index items may be calculated, and an index item having the highest similarity with the message may be selected as the response to the message.

In an implementation, it is preferred to find the response from a question-answer pair index set in the index database. For example, a gradient boosting decision tree (GBDT) classifier may be used for calculating similarities between the message and questions in the question-answer pair index set. Features of the GBDT classifier may include at least one of: edit distance in a word level between a message and a question; edit distance in a character level between a message and a question; Word2Vec similarity between a message and a question; BM25 score between a message and a question; and so on. Upon obtaining similarity scores of the questions in the question-answer pair index set, an answer corresponding to the top-ranked question may be determined as the response. If the similarity scores of the questions in the question-answer pair index set are all below a predetermined threshold, i.e., all the questions do not have enough similarities with the message, a pure chat index set in the index database may be used for further finding a response. Any existing relevance-based searching techniques may be adopted for determining a response from the pure chat index set.

In another implementation, a list of high-frequency messages and corresponding candidate responses may be established in the index database. Herein, the high-frequency messages may refer to messages occurred in various chat scenarios in a high possibility, such as, greetings. When determining a response, a matching may be performed firstly between the message obtained at 610 and the high-frequency messages in the list. If a matched high-frequency message in the list is found, a candidate response corresponding to the matched high-frequency message may be determined as the response to the message. If no matched high-frequency message can be found, a response may be determined from the question-answer pair index set and/or the pure chat index set as discussed above.

In another implementation, as discussed above, a game related subset in the pure chat index set may be given a higher priority or weight than a non-game related subset in the pure chat index set. Thus, when trying to determine a response from the pure chat index set, a game related response may be determined in a higher priority.

At 630, the determined response may be provided to the player in a chat flow. For example, the response may be displayed in the chat window of the game interface.

It should be appreciated that if the response is determined from the question-answer pair index set or from the game related subset in the pure chat index set, the response may also be a response that is associated with the game.

Moreover, it should be appreciated that the message inputted by the player is not limited to text, and the message may also be in a form of speech, image, etc. For a speech message, the method 600 may also comprise performing a speech-to-text conversion on the speech message to obtain a corresponding text message. Then, a response may be determined based on the text message. For an image message, the method 600 may use the CNN-RNN similarity model, as discussed above, to determine a response. For example, the CNN-RNN similarity model may be used for determining similarities between the image message and index items in the index database, and an index item having the highest similarity with the image message may be selected as the response.

Moreover, it should be appreciated that the response by the chatbot is not limited to text, and the response may also be in a form of speech, image, etc. In the case of providing speech response, the method 600 may perform a text-to-speech conversion on a text response to obtain a corresponding speech response, and provide the speech response to the player. In the case of providing image response, the method 600 may firstly determine an index item in the index database as the response to a message, and then, if existed, obtain a corresponding image associated with the index item, such as, a question-answer pair, from the index database. Both or either of the index item and the image associated with the index item may be provided as the response. Alternatively, the method 600 may directly use the CNN-RNN similarity model for determining similarities between a message and images in the index database, and an image having the highest similarity with the message may be selected as the response.

Figure 7:
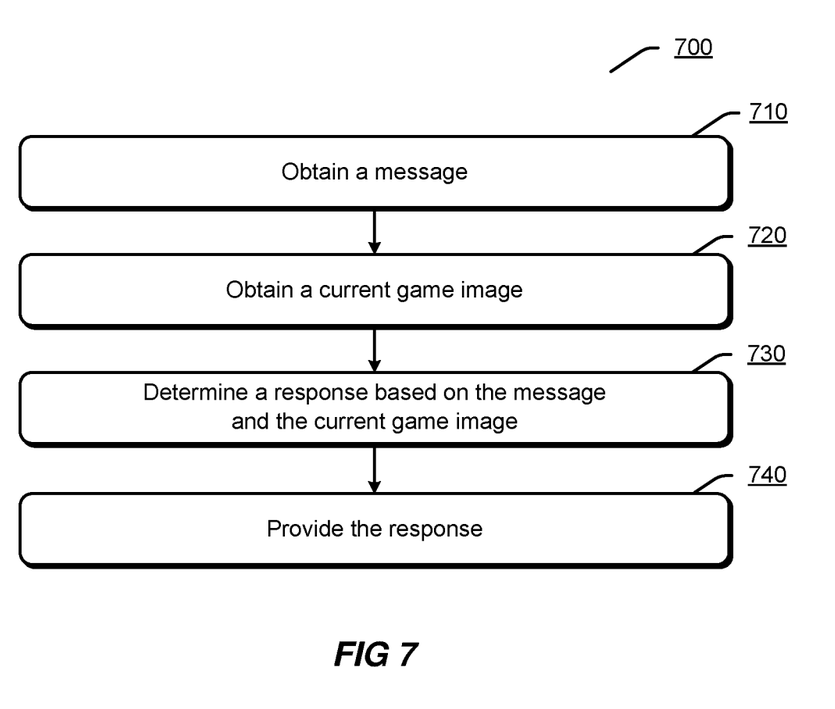
FIG. 7 illustrates a flowchart of an exemplary method for providing a response according to an embodiment.

FIG. 7 illustrates a flowchart of an exemplary method 700 for providing a response according to an embodiment. The method 700 is a further implementation on the basis of the method 600 in FIG. 6. Through the method 700, a response may be determined and provided based on a combination of a message and a current game image.

In some cases, the current game image in a game screen of a game interface may provide additional information for the message from a player, and thus the chatbot may better understand an intention of the player based on the current game image in addition to the message, and provide a more relevant response. For example, if the player inputs a message "What is the animal?", it may be difficult to find an appropriate response only based on the message, since the message does not contain enough information for the chat bot to know any attributes of the "animal". However, assuming that a dog, as an entity, is displayed in the game screen now, the chat bot may recognize from the current game image that the "animal" in the message may refer to the dog being displayed in the game screen, and thus a response related to the dog, such as, description of the dog, may be determined and provided to the player.

At 710, a message may be obtained from the chat window of the game interface.

At 720, a current game image may be obtained. The current game image may be, such as, a shortcut of the game screen, and may contain one or more entities currently displayed in the game screen.

At 730, a response may be determined from an index database based on the message and the current game image. For example, the message and the current game image may be combined together, and the combination may be used for determining the response.

Various approaches may be adopted for combining the message and the current game image. In an implementation, the combining may be performed in a vector space. Through the CNN part of the CNN-RNN similarity model as discussed above, the current game image may be converted to a vector corresponding to the current game image, and the message may also be converted to a vector corresponding to the message. The vector corresponding to the current game image and the vector corresponding to the message may be combined, such as, concatenated or accumulated together, so as to obtain a combined vector. The combined vector may be further used for determining the response from the index database.

At 740, the determined response may be provided to the player in a chat flow.

Figure 8:
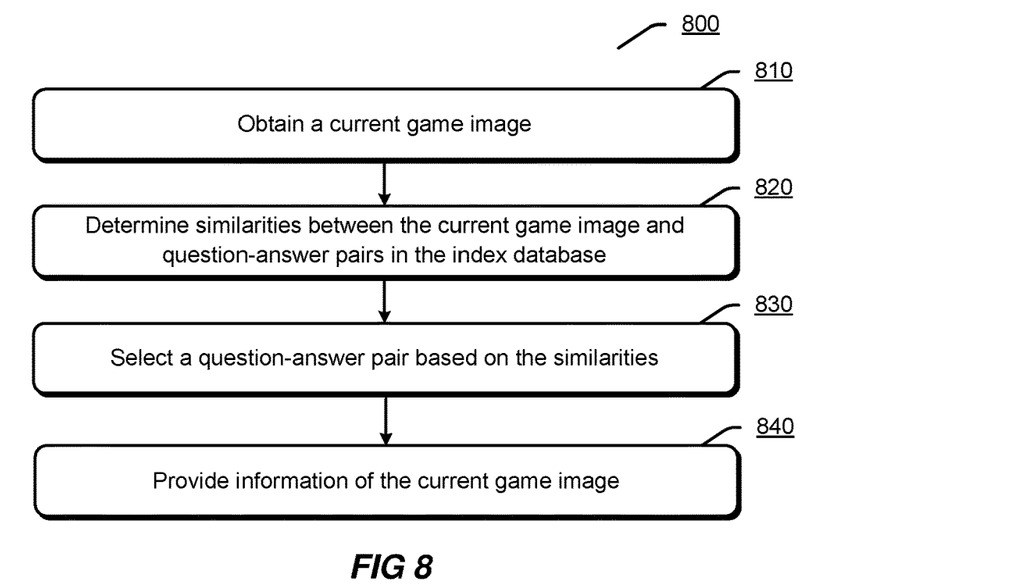
FIG. 8 illustrates a flowchart of an exemplary method for providing information of a current game image according to an embodiment.

FIG. 8 illustrates a flowchart of an exemplary method 800 for providing information of a current game image according to an embodiment. In some cases, the player of a game may desire to obtain description information of game images being displayed in a game screen, such as, profiles of characters, introduction of a scene, etc. Such information would be helpful for the player to better understand the game, decide a next action, etc. As the game proceeds, the chat bot may provide information of a current game image initiatively or on-request, thus the player may obtain description information about what he is seeing in the game screen timely.

At 810, a current game image may be obtained from the game interface. The current game image may be, such as, a shortcut of the game screen of the game interface, and may contain one or more entities currently displayed in the game screen.

At 820, similarities between the current game image and question-answer pairs in an index database may be determined.

In an implementation, the CNN-RNN similarity model as discussed above may be adopted for determining the similarities. For example, through the CNN-RNN similarity model, similarity scores may be calculated for the question-answer pairs in the question-answer pair index set in an index database.

At 830, a question-answer pair may be selected as information of the current game image based on the similarities. The selected question-answer pair may be the top-ranked question-answer pair, e.g., with the highest similarity score, among the question-answer pairs in the index database. It should be appreciated that either the complete selected question-answer pair, or a part of the selected question-answer pair, e.g., the answer part, may be taken as the information of the current game image.

At 840, the information of the current game image may be provided to the player in a chat flow. For example, the information of the current game image may be displayed in the chat window of the game interface.

Figure 9:
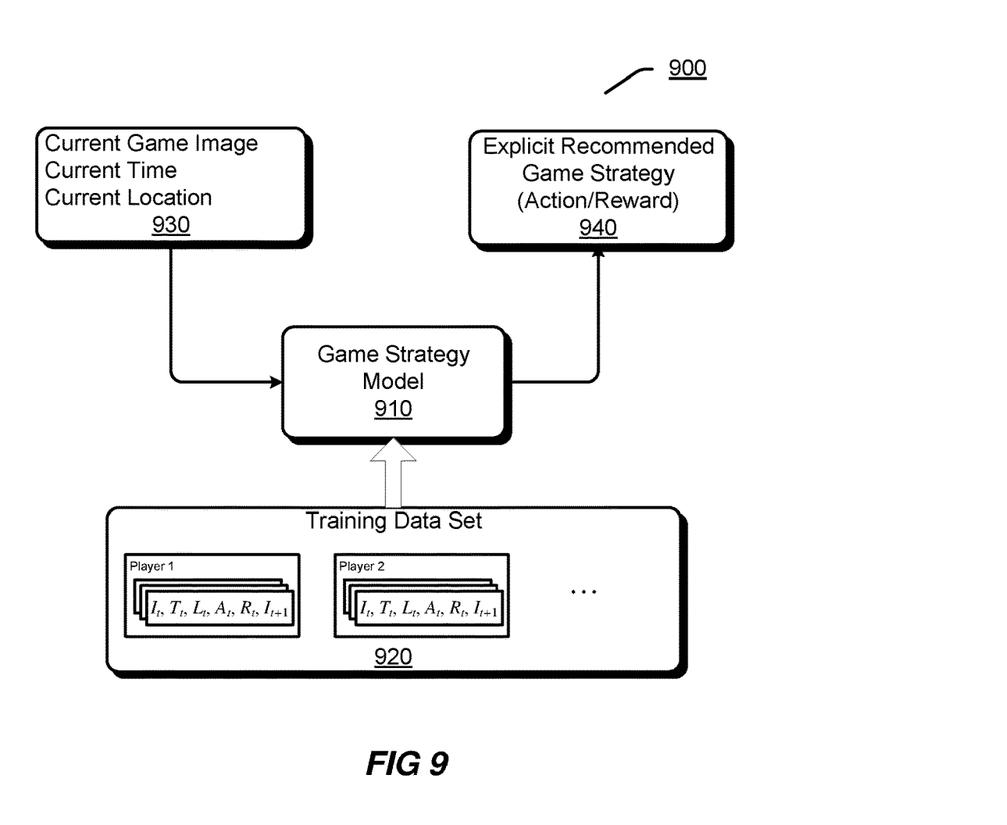
FIG. 9 illustrates an exemplary process for providing an explicit recommended game strategy according to an embodiment.

FIG. 9 illustrates an exemplary process 900 for providing an explicit recommended game strategy according to an embodiment. The process 900 may be applied in an AR game, for providing a player with assistance by pushing explicit recommended game strategies.

Although some explicit strategies of the game can be found from websites on the network, these game strategies may be not detailed enough to guide the player to proceed on a basis of game image, and may not adapt to the latest version of the game. The embodiment of the present disclosure may collect historical data from a plurality of players of the game and train a game strategy model by the historical data, and then apply the game strategy model to provide explicit recommended game strategies.

As shown in FIG. 9, a game strategy model 910 may be trained and applied. In an implementation, the game strategy model 910 may be based on an improvement on an existing Deep Reinforcement Learning (DRL) model. The DRL model is an experience replay technique for games. A player's experience at time t is denoted as $e_t=(s_t, a_t, r_t, s_{t+1})$, where $s_t$ is the current state, $a_t$ is an action of the player based on $s_t$, $r_t$ is a reward caused by applying $a_t$ to $s_t$, and $s_{t+1}$ is the next state.

The game strategy model 910 for the AR game according to the implementation defines the following features for the player's experience $E_t$ at time t: the current game image $I_t$, the current time $T_t$ in the real world, the current location $L_t$ in the real world, an action $A_t$ of the player based on $I_t$, a reward $R_t$ caused by applying $A_t$ to $I_t$, and the next game image $I_{t+1}$. Thus, a list of features $(I_t, T_t, L_t, A_t, R_t, I_{t+1})$ of the AR game from a player may be used as a piece of training data for the game strategy model 910.

A training data set 820 is shown in FIG. 9, which may include historical data from a plurality of players. The training data set 820 may be used for training the game strategy model 910 through machine learning.

In an implementation, the training data set 820 may be updated dynamically, and accordingly the training of the game strategy model 910 may be dynamically performed. For example, once new training data is obtained, the training of the game strategy model 910 may be triggered, and thus the game strategy model 910 may be updated accordingly.

In another implementation, those training data in the training data set 820 that is initiatively shared by players may be given higher weights than other training data during the training of the game strategy model 910. For example, some players may desire to share their experiences at a certain time at which, for example, they gain a reward or make an advance in the game. The chatbot may obtain training data from these players when these players order the chatbot to share their experiences. The training data from the shared experiences of these players may be more important or more representative than other training data, and thus may be given higher weights during the training of the game strategy model 910. For example, the weights may be given based on a ranking of rewards.

Upon the game strategy model 910 for the AR game is established, it may be further applied for providing explicit recommended game strategies to a player. For example, when the player is playing the AR game, an input 930 to the game strategy model 910 may comprise the current game image, the current time in the real world and the current location in the real world. Based on the input 930, the game strategy model 910 may generate an explicit recommended game strategy 940. The explicit recommended game strategy 940 may comprise a recommended action which is a suggestion on the next action the player may take. The explicit recommended game strategy 940 may also comprise both of a recommended action and a reward corresponding to the recommended action, wherein the reward may be caused if the player takes the recommended action at the current game image.

The explicit recommended game strategy 940 may be transferred to a game interface such that the explicit recommended game strategy 940 can be displayed to the players in a chat window of the game interface.

Besides providing an explicit recommended game strategy as shown in FIG. 9, an embodiment of the present disclosure may also provide an implicit recommended game strategy in real time.

Usually, a player of a game, hereinafter called as "first player", can't obtain other players' game information or game information of other players in other game groups. For example, when the first player and said other players are being in the same game scenario, there is no mechanism provided by the game itself for making the first player know real time game information of said other players. Herein, the game information may refer to an action taken at a game image and/or a reward corresponding to the action. According to the embodiment of the present disclosure, the chatbot may provide such information to the first player of the game in real time, for assisting the first player to make a decision on next action. The chatbot may perform a real time matching between the first player's current game image and other players' current or recent game image. The first player and said other players may have the same game target or go through the same series of awards in the game. If a matched game image of a second player among said other players is found, the chatbot may determine that the first player and the second player are under the same game scenario, and thus the chatbot may retrieve real time game information of the second player, e.g., an action taken by the second player at the matched game image and/or a reward corresponding to the action gained by the second player, and provide the real time game information of the second player to the first player as an implicit recommended game strategy. The implicit recommended game strategy may be transferred to the game interface such that the implicit recommended game strategy can be displayed to the first player in the chat window of the game interface. Upon obtaining the implicit recommended game strategy in real time, through making reference to the experience of the second player who is under the same game scenario, the first player may decide what next action shall be taken and may learn what award can be expected.

Figure 10:
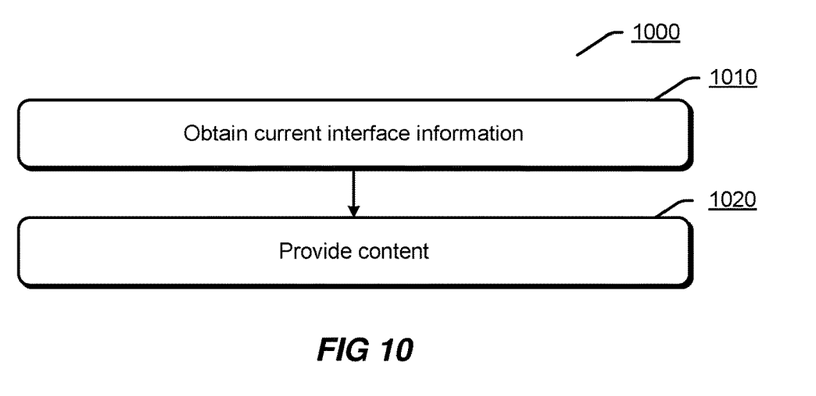
FIG. 10 illustrates a flowchart of an exemplary method for providing content according to an embodiment.

FIG. 10 illustrates a flowchart of an exemplary method 1000 for providing content according to an embodiment.

At 1010, current interface information of an electrical game may be obtained. The current interface information may refer to information being displayed in a game interface, such as, a current game image in a game screen of the game interface, a current message in a chat window of the game interface, etc.

At 1020, content associated with the electrical game may be provided in a chat flow based on at least the current interface information.

In an implementation, the current interface information may comprise a current game image. The content may comprise information of the current game image. The information of the current game image may be determined from an index database. The index database may include a plurality of question-answer pairs, and the information of the current game image may be based on one of the plurality of question-answer pairs which has the highest similarity with the current game image.

In an implementation, the current interface information may comprise a current game image. The content may comprise an explicit recommended game strategy. The explicit recommended game strategy may include a recommended action, or both a recommended action and a reward corresponding to the recommended action.

The electrical game may be an AR game, and the method 1000 may further comprise: obtaining current time and current location in the real world; and obtaining the explicit recommended game strategy through a game strategy model based on at least the current game image, the current time and the current location. The game strategy model may be established through machine learning based on historical data of a plurality of players, the historical data including at least one of game image, time, location, action, award and next game image.

In an implementation, the current interface information may comprise a current game image. The content may comprise an implicit recommended game strategy. The implicit recommended game strategy may include real time game information of other players having a matched game image with the current game image.

In an implementation, the current interface information may comprise a message in the chat flow. The content may comprise a response to the message. The response may include at least one of a text associated with the electrical game, a speech associated with the electrical game and an image associated with the electrical game.

The current interface information may comprise a current game image, and the response may be determined based on at least the current game image and the message. The response may be determined through: obtaining a combination of the current game image and the message in a vector space; obtaining similarities between the combination and questions in an index database, the index database including a plurality of question-answer pairs; and selecting an answer from the index database as the response, the answer corresponding to a question having the highest similarity with the combination.

In an implementation, the plurality of question-answer pairs in the index database may comprise at least one of: question-answer pairs from an official website of the electrical game; question-answer pairs from non-official game related websites; and question-answer pairs generated by plain texts from the official website and the non-official game related websites. At least one of the generated question-answer pairs may be determined based on a group of sentences in the plain texts.

In an implementation, the index database may further comprise images associated with at least one of the plurality of question-answer pairs.

Figure 11:
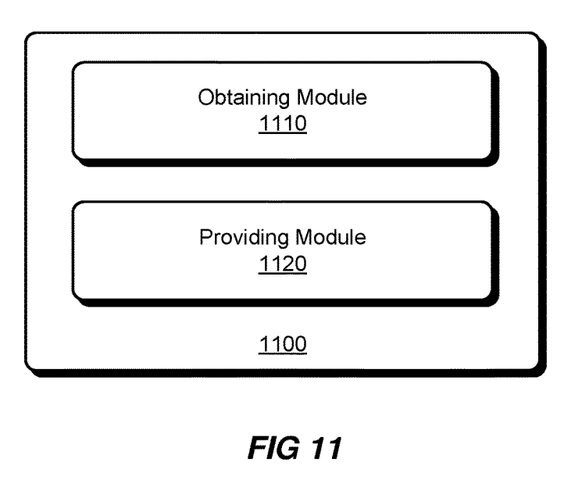
FIG. 11 illustrates an exemplary apparatus for providing content according to an embodiment.

FIG. 11 illustrates an exemplary apparatus 1100 for providing content according to an embodiment.

The apparatus 1100 may comprise an obtaining module 1110 and a providing module 1120. The obtaining module 1110 is for obtaining current interface information of an electrical game. The providing module 1120 is for providing content associated with the electrical game in a chat flow based on at least the current interface information.

In an implementation, the current interface information may comprise a current game image. The content may comprise information of the current game image. The information of the current game image may be determined from an index database. The index database may include a plurality of question-answer pairs. The information of the current game image may be based on one of the plurality of question-answer pairs which has the highest similarity with the current game image.

In an implementation, the current interface information may comprise a current game image. The content may comprise an explicit recommended game strategy. The explicit recommended game strategy may include a recommended action, or both a recommended action and a reward corresponding to the recommended action.

The electrical game may be an AR game. The apparatus 1100 may further comprise: a module for obtaining current time and current location in the real world; and a module for obtaining the explicit recommended game strategy through a game strategy model based on at least the current game image, the current time and the current location. The game strategy model may be established through machine learning based on historical data of a plurality of players. The historical data may include at least one of game image, time, location, action, award and next game image.

In an implementation, the current interface information may comprise a message in the chat flow. The content may comprise a response to the message. The response may include at least one of a text associated with the electrical game, a speech associated with the electrical game and an image associated with the electrical game.

In an implementation, the current interface information may comprise a current game image. The response may be determined based on at least the current game image and the message.

Moreover, the apparatus 1100 may also comprise any other modules configured for performing any operations of the methods for providing content according to the embodiments of the present disclosure as mentioned above.

Figure 12:
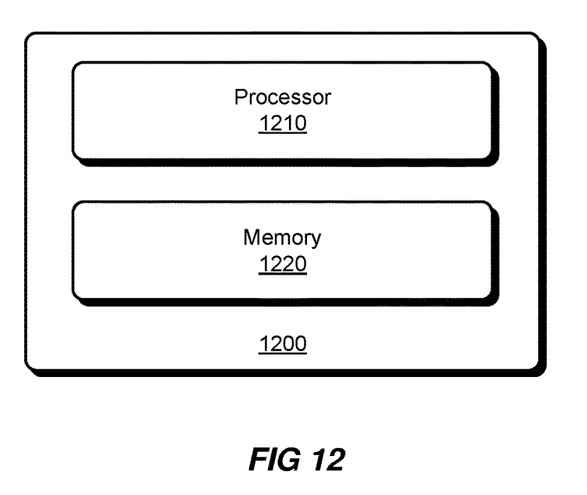
FIG. 12 illustrates an exemplary apparatus for providing content according to an embodiment.

FIG. 12 illustrates an exemplary apparatus 1200 for providing content according to an embodiment.

The apparatus 1200 may comprise one or more processors 1210. The apparatus 1200 may further comprise a memory 1220 that is connected with the one or more processors 1210. The memory 1220 may store computer-executable instructions that, when executed, cause the one or more processors 1210 to perform any operations of the methods for providing content according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for providing content according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for providing content, comprising:
    obtaining current interface information of an electrical game, wherein the current interface information includes a current game image and a message in a chat flow;
    obtaining a combination of the current game image and the message in a vector space;
    obtaining similarities between the combination and questions in an index database, the index database including a plurality of question-answer pairs;
    selecting an answer from the index database as a response to the message, the answer corresponding to a question having the highest similarity with the combination; and
    providing content associated with the electrical game in the chat flow based on at least the current interface information, the content including the response.

2. The method of claim 1, wherein
    the content comprises information of the current game image.

3. The method of claim 1, wherein
    the content comprises an explicit recommended game strategy, the explicit recommended game strategy including a recommended action, or both a recommended action and a reward corresponding to the recommended action.

4. The method of claim 3, wherein the electrical game is an Augmented Reality (AR) game, and the method further comprises:
    obtaining current time and current location in the real world; and obtaining the explicit recommended game strategy through a game strategy model based on at least the current game image, the current time and the current location.

5. The method of claim 4, wherein the game strategy model is established through machine learning based on historical data of a plurality of players, the historical data including at least one of game image, time, location, action, award and next game image.

6. The method of claim 1, wherein the content comprises an implicit recommended game strategy, the implicit recommended game strategy including real time game information of other players having a matched game image with the current game image.

7. The method of claim 1, wherein the content comprises a response to the message, the response including at least one of a text associated with the electrical game, a speech associated with the electrical game and an image associated with the electrical game.

8. The method of claim 7, wherein the response is determined based on at least the current game image and the message.

9. The method of claim 1, wherein the plurality of question-answer pairs comprise at least one of:
question-answer pairs from an official website of the electrical game;
question-answer pairs from non-official game related websites; and
question-answer pairs generated by plain texts from the official website and the non-official game related websites.

10. The method of claim 9, wherein at least one of the generated question-answer pairs is determined based on a group of sentences in the plain texts.

11. The method of claim 1, wherein the index database comprises images associated with at least one of the plurality of question-answer pairs.

12. An apparatus for providing content, comprising:
at least one processor; and
memory including instructions that, when executed by the at least one processor, cause the at least one processor to perform operations to:
obtain current interface information of an electrical game, wherein the current interface information includes a current game image and a message in a chat flow;
obtain a combination of the current game image and the message in a vector space;
obtain similarities between the combination and questions in an index database, the index database including a plurality of question-answer pairs;
select an answer from the index database as a response to the message, the answer corresponding to a question having the highest similarity with the combination; and
provide content associated with the electrical game in the chat flow based on at least the current interface information, the content including the response.

13. The apparatus of claim 12, wherein game strategy including a recommended action, or both a recommended action and a reward corresponding to the recommended action.

14. The apparatus of claim 13, wherein the electrical game is an Augmented Reality (AR) game, and the memory further comprises instructions that, when executed by the at least one processor cause the at least one processor to perform operations to:
obtain current time and current location in the real world; and
obtain the explicit recommended game strategy through a game strategy model based on at least the current game image, the current time and the current location.

15. The apparatus of claim 12, wherein the content comprises a response to the message, the response including at least one of a text associated with the electrical game, a speech associated with the electrical game and an image associated with the electrical game.

16. The apparatus of claim 15, wherein the response is determined based on at least the current game image and the message.

* * * * *